(12) United States Patent
Hursey et al.

(10) Patent No.: US 7,941,129 B2
(45) Date of Patent: May 10, 2011

(54) MULTI-WAY MESSAGING WITH FORWARDING

(75) Inventors: John Thomas Hursey, Lawrenceville, GA (US); Justin Michael McNamara, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 327 days.

(21) Appl. No.: 11/652,110

(22) Filed: Jan. 11, 2007

(65) Prior Publication Data

US 2008/0171549 A1 Jul. 17, 2008

(51) Int. Cl.
*H04L 29/08* (2006.01)

(52) U.S. Cl. .............. 455/414.4; 455/462; 455/466; 455/445; 370/329

(58) Field of Classification Search .......... 455/466, 455/423, 414, 550, 411, 456.1–456.3, 445; 370/329

See application file for complete search history.

(56) References Cited

U.S. PATENT DOCUMENTS

| | | | | |
|---|---|---|---|---|
| 5,946,629 A * | 8/1999 | Sawyer et al. | ............... | 455/466 |
| 7,366,530 B2 * | 4/2008 | McCann et al. | ............... | 455/466 |
| 7,424,302 B2 * | 9/2008 | Carpenter | .................... | 455/466 |
| 7,428,580 B2 * | 9/2008 | Hullfish et al. | ............... | 709/207 |
| 7,458,184 B2 * | 12/2008 | Lohtia | ........................ | 455/456.3 |
| 2002/0082030 A1 | 6/2002 | Berndt et al. | | |
| 2002/0085701 A1 * | 7/2002 | Parsons et al. | ........... | 379/211.01 |
| 2002/0090963 A1 * | 7/2002 | Avalos et al. | ................. | 455/466 |
| 2002/0137530 A1 | 9/2002 | Karve | | |
| 2003/0120805 A1 | 6/2003 | Couts et al. | | |
| 2005/0013426 A1 * | 1/2005 | Ooki | ........................ | 379/211.02 |
| 2005/0176409 A1 * | 8/2005 | Carpenter | .................. | 455/412.1 |
| 2005/0186969 A1 * | 8/2005 | Lohtia | ........................ | 455/456.3 |
| 2005/0221808 A1 * | 10/2005 | Karlsson et al. | .............. | 455/418 |
| 2005/0260994 A1 | 11/2005 | Losch | | |
| 2006/0046752 A1 | 3/2006 | Kalavade et al. | | |
| 2007/0149175 A1 * | 6/2007 | Ying et al. | .................. | 455/412.1 |
| 2007/0270132 A1 * | 11/2007 | Poosala | ........................ | 455/414.2 |
| 2007/0270133 A1 * | 11/2007 | Hampel et al. | ............. | 455/414.2 |
| 2007/0270160 A1 * | 11/2007 | Hampel et al. | ............. | 455/456.1 |
| 2007/0270161 A1 * | 11/2007 | Hampel et al. | ............. | 455/456.1 |
| 2007/0270162 A1 * | 11/2007 | Hampel et al. | ............. | 455/456.1 |
| 2007/0270163 A1 * | 11/2007 | Anupam et al. | ........... | 455/456.1 |

(Continued)

FOREIGN PATENT DOCUMENTS

EP 1255414 A2 * 11/2002

OTHER PUBLICATIONS

The International Bureau of WIPO, "International Preliminary Report on Patentability," issued Jul. 14, 2009, see all.

*Primary Examiner* — Jinsong Hu
*Assistant Examiner* — Nathan Taylor
(74) *Attorney, Agent, or Firm* — Moazzam & Associates, LLC

(57) ABSTRACT

Systems and methods are disclosed which allow for enhanced SMS forwarding by providing a technique for seamless two-way messaging between a source party and a redirected destination. An advantage of the present technique lies in the ability to replace any routing information (originating/destination addresses) between devices owned by the mobile subscriber. The subscriber may define the conditions under which his from or to addresses are switched between devices. This switching can occur for both incoming and outgoing messages, including SMS, MMS, and similar existing and future messaging protocols.

20 Claims, 6 Drawing Sheets

U.S. PATENT DOCUMENTS

| | | | |
|---|---|---|---|
| 2007/0270165 A1* | 11/2007 | Poosala | 455/456.3 |
| 2007/0270166 A1* | 11/2007 | Hampel et al. | 455/456.3 |
| 2008/0132259 A1* | 6/2008 | Vin | 455/466 |
| 2008/0200192 A1* | 8/2008 | Harris | 455/466 |
| 2008/0285734 A1* | 11/2008 | Ehlinger et al. | 379/201.07 |
| 2009/0016499 A1* | 1/2009 | Hullfish et al. | 379/93.01 |
| 2009/0111489 A1* | 4/2009 | Wilson | 455/466 |

* cited by examiner

MULTI-WAY MESSAGING WITH FORWARDING

BACKGROUND OF THE INVENTION

1. Field of the Invention

The present invention relates generally to messaging within mobile telecommunications networks. More particularly, the present invention relates to improved multi-way messaging between mobile subscribers with enabled forwarding.

2. Background of the Invention

Short Message Service (SMS) is a service available on most digital mobile telephones, and other mobile devices like pocket-PCs, or even laptop and desktop computers. SMS permits the transmitting of short messages between mobile telephones, other handheld devices and even landline telephones.

In SMS, messages are sent via a store-and-forward mechanism to a Short Message Service Centre (SMSC), which will attempt to send the message to the recipient. If the user is not reachable at a given moment, the SMSC will save the message. When the user is reachable, the SMSC will retry the delivery process. Both Mobile Terminated (MT), for messages sent to a mobile handset, and Mobile Originating (MO), for those that are sent from the mobile handset, operations are supported. Transmission of the short messages between SMSC and a telephone can be done through different protocols such as SS7 within the standard GSM MAP framework, or TCP/IP within the same standard. Routing data, originating and destination addresses, and message length are among the metadata that make up the message payload.

The idea of adding text messaging to the services of mobile users was latent in many communities of mobile communication services at the beginning of the 1980s. Initial growth was slow, with customers in 1995 sending on average only 0.4 messages per GSM customer per month. However, by the end of 2000, 17 billion messages were sent, and in 2001, 250 billion messages were sent. By mid-2004, SMS messages were being sent at a rate of 500 billion messages per annum. At an average cost of $0.10 per message, this generates revenues in excess of $50 billion for mobile telephone operators and represents close to 100 text messages for every person in the world.

There has been little advancement to messaging technology over cellular networks. Although SMS is forward compatible with 3G and better infrastructures, the basic process has remained the same. There exists the Enhanced Messaging Service (EMS) that enables mobile phones to send and receive messages that have special text formatting, animations, pictures, icons, sound effects and ring tones. There also exists the Multimedia Messaging Service (MMS) with which a mobile device can send and receive multimedia messages such as graphics, video and audio clips, and so on.

However, the problem still exists that sometimes, a message cannot be delivered to the recipient for a number of reasons. The recipient's phone may be switched off, damaged, unable to receive messages for some reason. More importantly, the recipient may own multiple wireless devices and would prefer to have any messages that are unable to reach the primary device be forwarded to the secondary device. For instance, the recipient may own a mobile phone with a number that is local to an area where many clients are located. However, the recipient himself is located in a different area code, and may own a second device having a number for that code. In such a case, the recipient would like to ensure seamless communication between himself and his clients.

Forwarding mechanisms for SMS are limited. Voice call forwarding is well defined in the GSM specification, but there is no supplementary service defined for SMS Forwarding. Even if SMS messages can be forwarded to a secondary device per the recipient's instructions, the recipient's reply will originate from the secondary device, which has potential to confuse the original sender.

What is lacking in conventional devices and is needed is a system that allows a mobile subscriber to assign a "virtual" identity based on a primary device that he owns and that is registered with the mobile operator. The MSISDN (telephone number or address) of this primary device can be the subscriber's contact number that he gives out to clients, friends, family, etc. If, for any reason, it becomes impractical or impossible for this device to receive messages, the subscriber would own a second device with a different MSISDN, and incoming messages can be forwarded to that secondary device. This system would also provide for the subscriber being able to reply to the message using the secondary device, and having the message appear to be sent from the primary device.

SUMMARY OF THE INVENTION

The present invention improves multi-way forwarded communication between mobile subscribers by allowing the essential functions to be performed by a secondary device while the primary device remains a "virtual" party to the communication.

In one exemplary embodiment, the present invention is a network system for improved two-way communication between mobile subscribers. The network system includes a device that transmits a message over the network; a device that receives the message; a database containing a plurality of forwarding instructions; and a server capable of rerouting the message per the instructions in the database.

In another exemplary embodiment, the present invention is a network system for improved two-way messaging between mobile subscribers. The network system includes a wireless communications device that transmits a message over a mobile network; a wireless communications device capable of receiving the message, wherein the message contains an originating address and a destination address; a server that is capable of storing and forwarding the message; a database containing a plurality of forwarding instructions; and a processor capable of modifying the originating and/or destination addresses in the message per the forwarding instructions from the database.

In yet another exemplary embodiment, the present invention is a method for enabling a mobile subscriber to receive and send messages using an alternate device. The method includes receiving a message at a server, wherein the message contains a originating address and a destination address; determining from a database containing a plurality of forwarding instructions that the originating address and/or the destination address is to be changed; replacing the originating address and/or the destination address in the message per the forwarding instructions in the database; and sending the message.

DETAILED DESCRIPTION OF THE INVENTION

The present invention allows for enhanced SMS forwarding by providing a technique for seamless multi-way messaging between a source party and a redirected destination. Additionally, an incoming message to a given device may undergo a duplication process unique to the present invention. In this process, a message sent to a particular destination gets duplicated and forwarded out to all of the user's numbers and/or accounts, including the original (prime or original number or account). One of the many advantages of the invention lies in the ability to replace any routing information (originating/destination addresses) between devices owned by a mobile subscriber. The subscriber may define the conditions under which his "from" or "to" addresses are switched between devices. This switching can occur for both incoming and outgoing messages, including SMS, MMS, SIP and similar existing and future messaging protocols.

Figure 6:
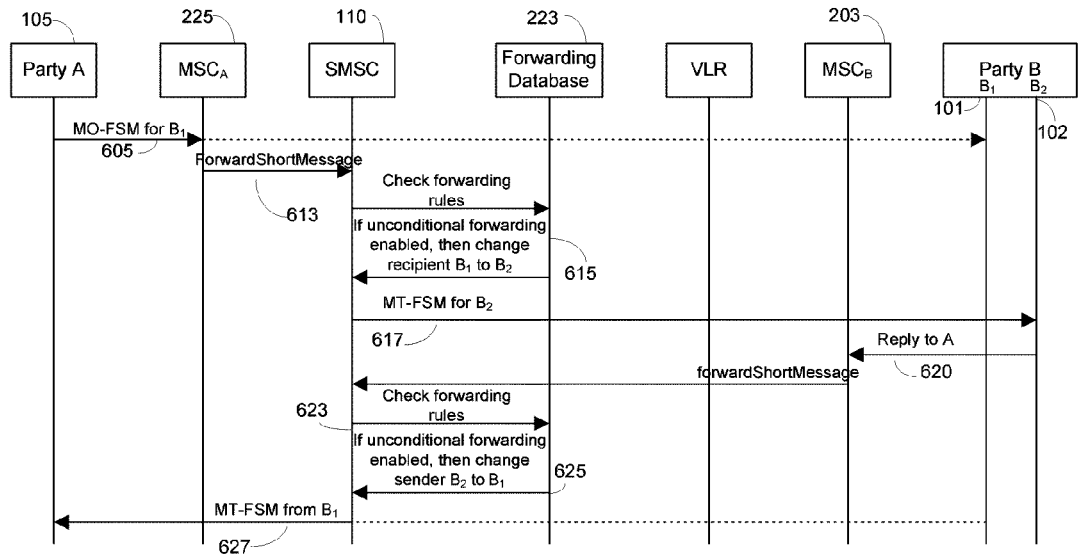
FIG. 6 shows a network diagram of a two-way communication between two mobile subscribers using unconditional forwarding, according to an exemplary embodiment of the present invention.

For example, Party B owns wireless communication devices $B_1$ and $B_2 \ldots B_N$ (and so on) where $B_1$ is the primary device and $B_2 \ldots B_N$ are any secondary devices. It should be noted that in this figure and subsequent examples, only two devices are shown for sake of simplicity, but in practice, multiple devices would be operating under the system according to the present invention. B would like all messages having device $B_1$ as an intended recipient to be forwarded to device $B_2$ (and/or other devices as well, which are not shown for sake of simplicity). To do so, B will set up forwarding and duplicating rules with the mobile operator. Forwarding and duplicating rules are any instructions to change device addresses in the message and duplicate the message into possible multiple formats and forward to all desired user devices. This forwarding can be conditional (FIG. 8) or unconditional (FIG. 6). Messages are forwarded all of the time, or only when certain conditions are present, e.g., device $B_1$ is switched off, or roaming or other pre-set condition. B can also customize whether outgoing messages will appear to be sent from $B_1$ or $B_2 \ldots B_N$. If enabled, any message sent out from device $B_2 \ldots B_N$ would have its properties and format changed by the SMS complex to appear to the recipient as if it had been sent from $B_1$. These forwarding and duplicating rules are stored in a database on the wireless network.

It should be noted that the "forwarding" properties of the system also include a novel "duplicating" property, such that the system duplicates the message received, changes format, if needed, according to the recipient device or system that is programmed to receive a forwarded message, and then forwards the duplicated message accordingly in proper format to the various receiving devices or targets. For example, when a call comes into $B_1$ and gets forwarded to $B_2 \ldots B_N$ (including for example, email or IM), the system changes the format of the original message according to which device or target is being forwarded a copy of such message. Conversely, when a reply is generated by any of the secondary devices (including, for example, email or IM) and gets forwarded to the system, the system changes format from that of the secondary device(s) to that which would appear to be specific to device $B_1$, thus making it appear that such response was generated and sent from device $B_1$. Such duplicating and forwarding function is inherent in the system and should be considered as part of and integrated within the various examples presented herein and throughout this disclosure.

Figure 1:
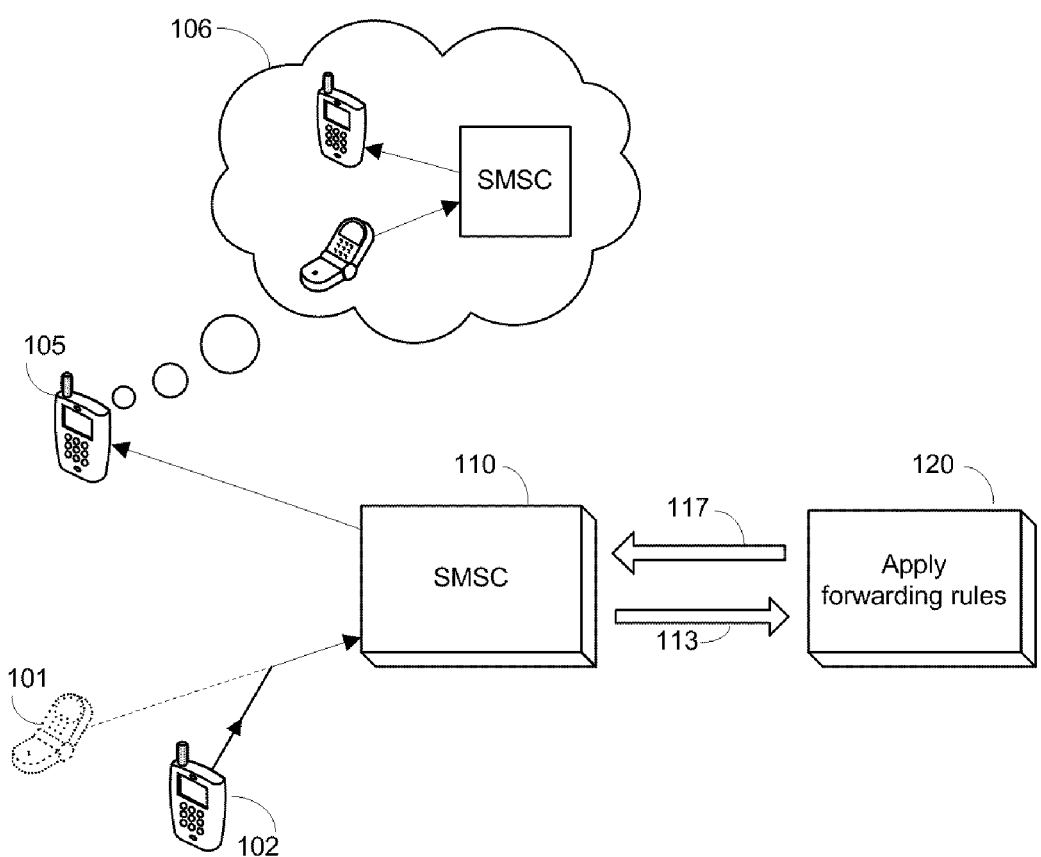
FIG. 1 shows a high-level schematic of a message being sent from a virtual device, according to an exemplary embodiment of the present invention.

FIG. 1 shows a high-level schematic of an environment according to an exemplary embodiment of the present invention. A user "B" has set up forwarding rules such that any message addressed to device $B_1$ 101 will be forwarded automatically to device $B_2$ 102. Other devices (not shown for sake of simplicity) may also be recipients of the messages to $B_1$ 101 so that a given message may be duplicated and forwarded to multiple secondary devices (although only one is shown, device 102). Device $B_1$ may be switched off, busy, or otherwise unable to receive messages. To reply to the original sender 105, all that B has to do is send out a message from device $B_2$ 102 (or other secondary devices not shown). The SMSC 110 checks if any forwarding and duplicating rules 120 have been set up by B. If rules exist, the SMSC 110 replaces the $B_2$ MSISDN (phone number or address) from the Mobile-Originated (MO) message 113 with the $B_1$ MSISDN in the new Mobile Terminated Forward Short Message (MT-FSM) 117, which is then sent to Party A 105. A is under the impression 106 that the message has been sent from device $B_1$ when in fact it was sent from device $B_2$ or other secondary devices (not shown).

This allows B to use any number of devices $B_2 \ldots B_N$, alone or in unison, in lieu of the primary device $B_1$, without A realizing or needing to know the multiple MSISDNs or Internet addresses are in use by B. Using any feasible method of updating his profile in the subscriber database, such as USSD messaging, provisioning, software application, SIP, or WAP, B may add or remove multiple forward destinations as he chooses. These forwarding rules can also be linked to the presence and location information of the subscriber. As a subscriber changes his active status on different applications or devices then a Presence and Location server is informed of the changes. The presence and location server in turn can forward this change of status to the SMS forwarding rules server. The network operator may also add additional logic based on the presence or location of the device on the network, if the device is out of coverage, roaming internationally or powered off then the subscribers forwarding rules may be invoked (see, for example, FIG. 8). To forward incoming messages, B may apply unconditional forwarding, in which case the SMSC would forward every incoming message to device $B_2$. Alternatively, B may apply conditional forwarding, in which case the SMSC would only forward a message to the alternate destination if device $B_1$ is switched off, or unable to receive messages for any reason defined by B.

Figure 2:
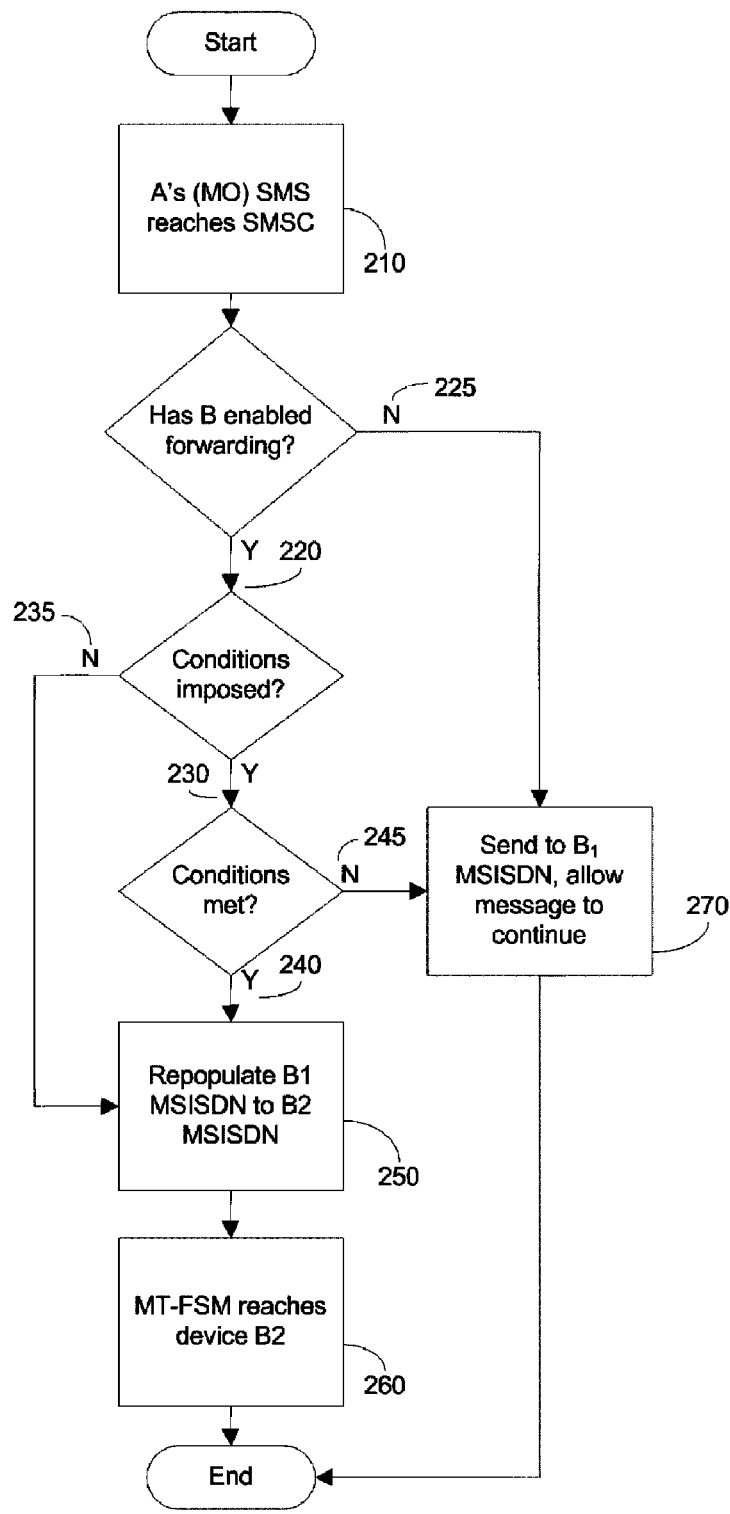
FIG. 2 shows a flowchart outlining the forwarding process for an incoming SMS message, according to an exemplary embodiment of the present invention.

A basic flow logic for forwarding incoming SMS messages (MT-FSM) is shown in FIG. 2. A sends the Mobile Originated SMS out to B's device $B_1$. The message traverses the MSC and reaches the SMSC 210. The SMSC then invokes the messaging gateway to check for any forwarding logic that B has set up. If B has enabled forwarding 220, it could be unconditional, or subject to conditions such as device $B_1$ being switched off, unreachable, or roaming. It is also possible to subject the forwarding to conditions such as incoming from a particular sender, sent after a certain time or date, the length of the message, or any other factor apparent to one skilled in the art.

If B has imposed conditions 230, and all conditions are satisfied 240, then the forwarding logic kicks in 250. The basic procedure is that the MSISDN (or subscriber number/telephone number) for device $B_1$ that exists in the message header is replaced by the MSISDN for device $B_2$. This new MT-FSM reaches $B_2$ and forwarding is successful 260. If B has not imposed conditions, e.g., enabled unconditional forwarding 235, then the forwarding logic will always run.

If B has not enabled forwarding 225, or if the conditions for forwarding are not met 245, then the message pathway remains unchanged 270. The headers remain the same, and the message will reach B's MSC and device $B_1$. If device $B_1$ is switched off or unreachable for any reason, the message will be stored in the SMSC, and forwarded when device $B_1$ becomes available.

Figure 3:
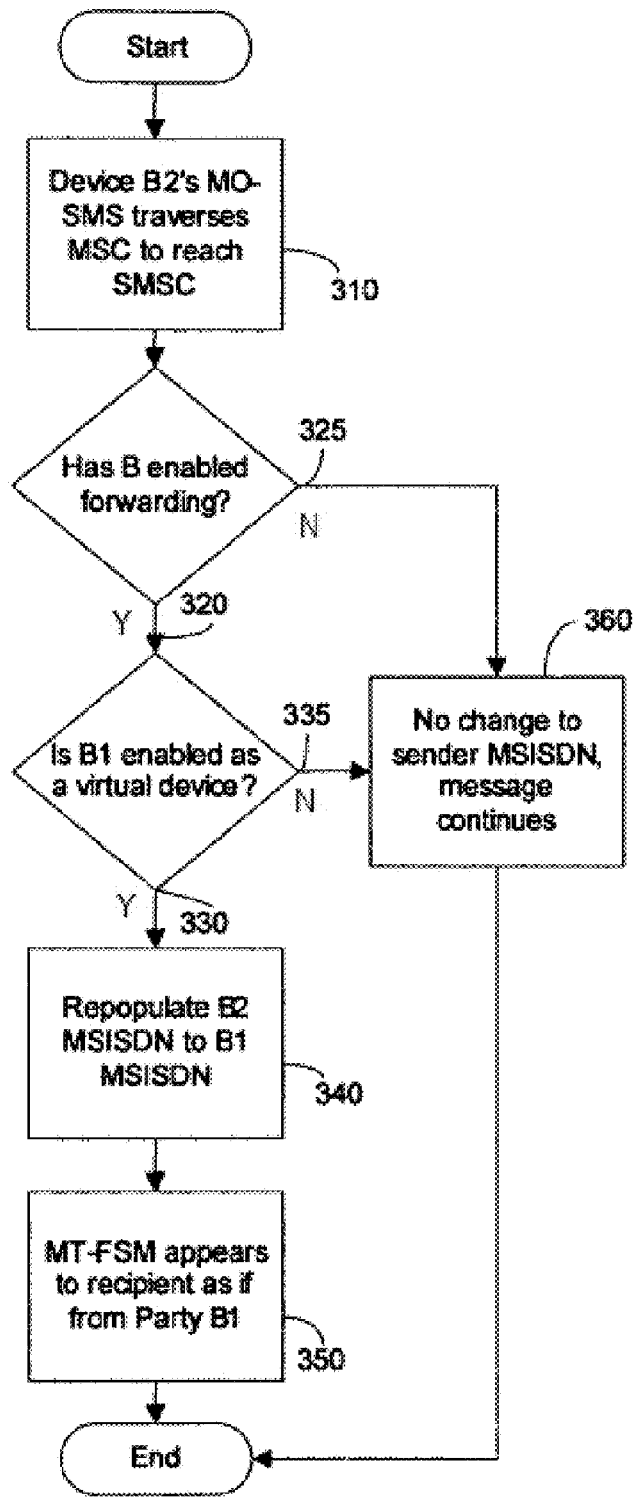
FIG. 3 shows a flowchart outlining the virtual sender process for an outgoing SMS message, according to an exemplary embodiment of the present invention.

The present invention utilizes the above system to improve multi-way forwarded communication between mobile subscribers by allowing the essential functions to be performed by a secondary device (or multiple secondary devices) while the primary device remains a "virtual" party to the communication. FIG. 3 shows the logic of this feature. To reply to the sender, B transmits a MO SMS to the wireless network 310. This message has $B_2$ as the sender in its header. The SMSC looks for forwarding rules in the message gateway. If such rules exist 320, then it checks to see whether or not B has enabled the feature that allows $B_1$ to be used as a virtual device. If $B_1$ is configured as a virtual device 330, then the SMSC replaces the $B_2$ MSISDN from the message header with the $B_1$ MSISDN 340. It then sends the MT-FSM to the recipient, who is under the impression that the reply has come from $B_1$ 350. If B has not enabled forwarding 325, or if $B_1$ is not enabled as a virtual device 335, then the message pathway remains unchanged 360. The headers remain the same, and the message will reach its destination appearing to have been sent from device $B_2$.

Figure 4:
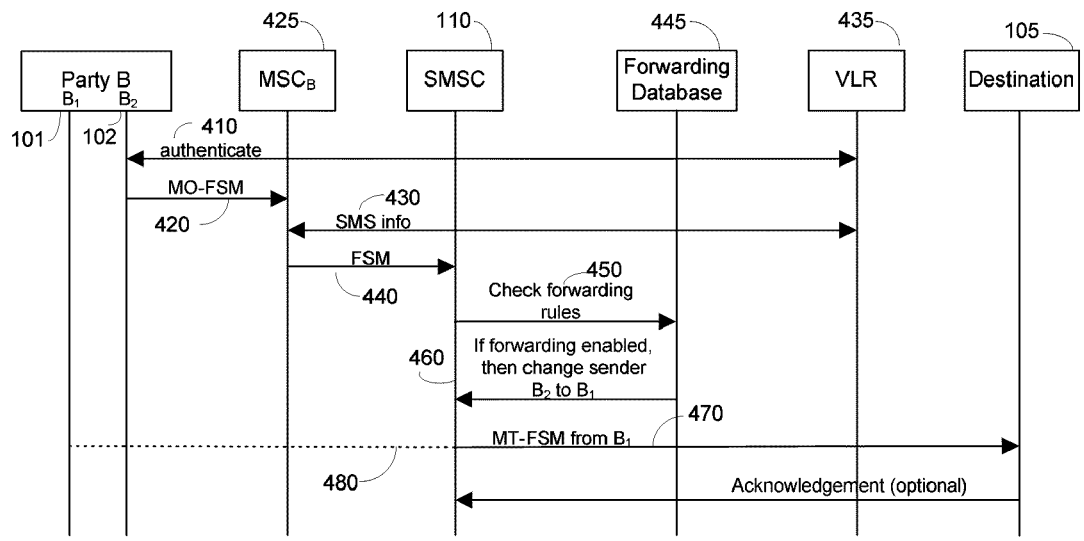
FIG. 4 shows a network diagram of the path of an outgoing message in a GSM network, according to an exemplary embodiment of the present invention.

FIG. 4 shows an exemplary embodiment of the present invention as used in a GSM network. Party B has enabled call forwarding from devices $B_1$ 101 to $B_2$ 102, and would like to reply from device $B_2$. $B_2$ is switched on and registers with the network 410. $B_2$ sends an outgoing message 420 to $MSC_B$ 425, which interrogates the VLR 435 to verify that the message transfer is allowed under the supplementary services and does not violate any restrictions imposed 430. The MSC then sends the short message to the SMSC 110 using the forwardShortMessage (FSM) operation 440. The SMSC queries the user database 445 (forwarding database) to check if B has enabled forwarding 450. If B has elected to forward incoming messages to $B_2$, AND has elected to show $B_1$ as the sender of outgoing messages, the SMSC will repopulate the $B_2$ MSISDN in the header of the message to the $B_1$ MSISDN 460. Then the SMSC sends the MT-FSM 470 out to the destination party 105, who will be under the impression that device $B_1$ was the sender 480.

Figure 5:
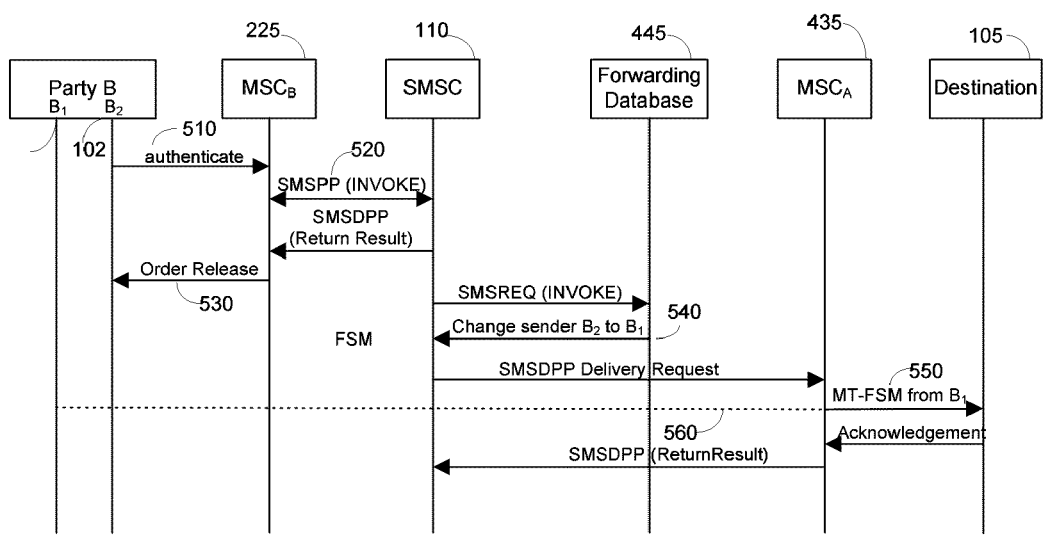
FIG. 5 shows a network diagram of the path of an outgoing message in an IS-41 network, according to an exemplary embodiment of the present invention.

FIG. 5 shows a similar exemplary embodiment, but as used in IS-41 systems. $B_2$ is switched on and registers with the network. $B_2$ sends an outgoing message 510 to $MSC_B$ 225, which interrogates the SMSC 110 to verify that the message transfer is allowed under the supplementary services and does not violate any restrictions imposed. The MSC sends the short message to the SMSC using the SMSPP Invoke operation 520. Once verification is complete, the MSC returns an Order Release 530 to $B_2$. The SMSC then queries the user database (forwarding database) 445 to check if B has enabled forwarding. As in the previous exemplary embodiment, if B has so elected, the SMSC will repopulate the $B_2$ MSISDN in the header of the message to the B1 MSISDN 540. Then the SMSC sends the MT-FSM out to the destination MSCA, which will forward it 550 to the recipient, who will be under the impression 560 that device $B_1$ was the sender. The destination device acknowledges to the MSCA the successful outcome of the SMSDPP operation. The MSCA returns to the SMSC the outcome of the operation (delivery successful).

A typical application of an exemplary embodiment of the present invention is shown in FIG. 6. Party A 105 sends a message to device $B_1$ 101. The message is forwarded to $B_2$ 102. $B_2$ replies to party A, who is under the impression that the reply originated from $B_1$. First, Party A sends out the MO SMS 605 to its MSC 225. The MSC sends the message to the SMSC 110 using the forwardShortMessage operation 613. The SMSC 110 verifies that forwarding rules exist, applies the rule, and changes the destination address in the message 615. The MT-FSM is sent out 617 to device $B_2$.

B chooses to reply to the message using device $B_2$. The process here is the same as in the outgoing message over a GSM network shown in FIG. 5. $B_2$'s reply is sent to $MSC_B$ 620 which forwards the message to the SMSC 110. The SMSC 110 verifies the existence of forwarding rules 623, and changes the originating address to that of $B_1$ 625. Party A receives an MT-FSM that appears to have been sent from $B_1$ 627.

Figure 8:
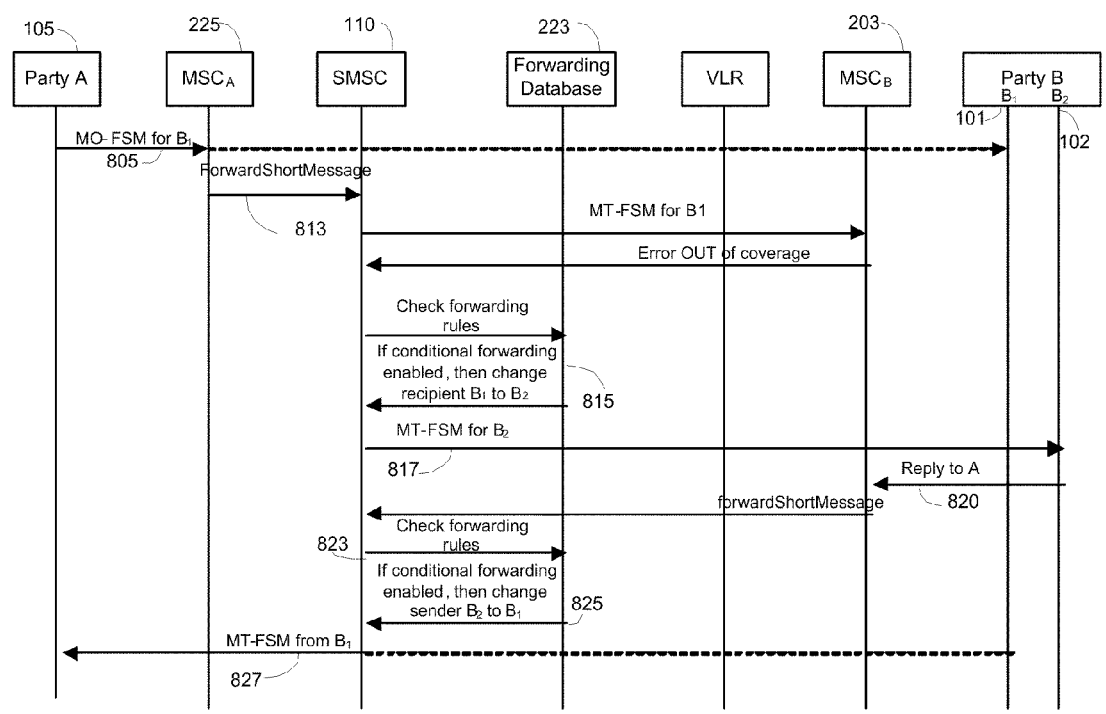
FIG. 8 shows a network diagram of a two-way communication between two mobile subscribers using conditional forwarding, according to an exemplary embodiment of the present invention.

Another exemplary embodiment of the present invention is shown in FIG. 8. Here, the pathway is similar to FIG. 6, but is conditional rather than unconditional forwarding, and relates to presence and location. As a subscriber changes his active status on different applications or devices then a Presence and Location server is informed of the changes. The presence and location server in turn can forward this change of status to the SMS forwarding rules server. The network operator may also add additional logic based on the presence or location of the device on the network, if the device is out of coverage, roaming internationally or powered off then the subscribers forwarding rules may be invoked. Otherwise, the process is as described for FIG. 6.

Figure 7:
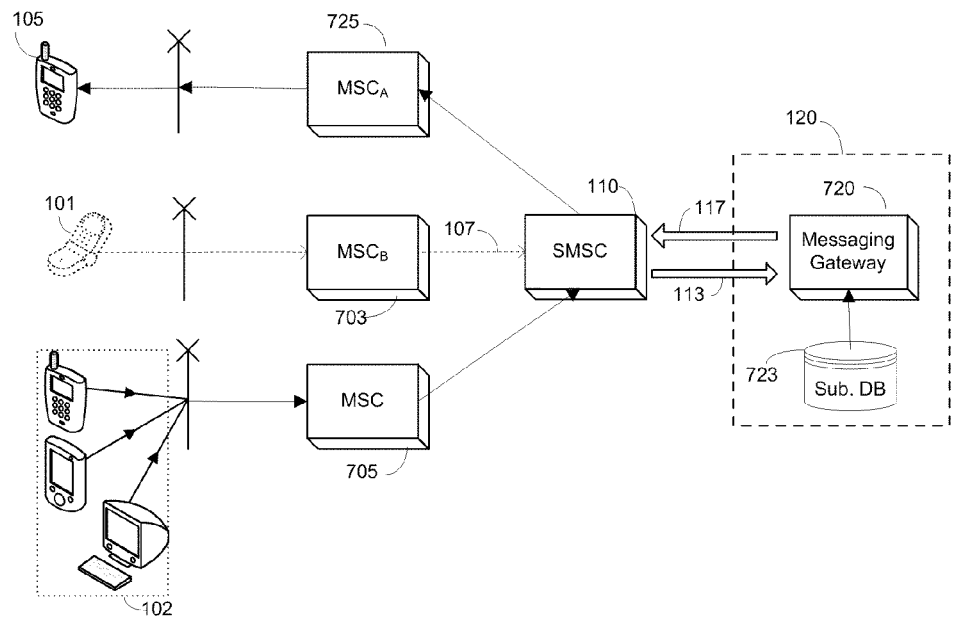
FIG. 7 shows a schematic for the secondary device being served by a different MSC, according to an exemplary embodiment of the current invention.

The present invention has many uses and is especially useful for mobile subscribers that own multiple devices with multiple area codes, or for those who maintain a device in their home area and a secondary device when roaming to other areas. In such cases, it is ideal to maintain effortless communication with other parties who may not and need not be aware of the existence of the secondary device. In the exemplary embodiment shown in FIG. 7, party B would like to send a message to party A 105. Device $B_1$ 101 and device(s) $B_2$ 102 are in different physical locations, being served by different MSCs. An SMS message from $B_2$ will traverse MSC 705 and reaches the SMSC 110. The SMSC invokes the messaging gateway 720 which checks the Subscriber Database 723 for any existing forwarding rules. Assuming party B has set up forwarding, the messaging gateway will check the subscriber database to see whether B has chosen to show $B_1$ as the sender. If this rule is enabled, then the gateway will change the originating address in the original message 113 from the $B_2$ MSISDN to the $B_1$ MSISDN. The MT-FSM showing $B_1$ as the sender 117 is then sent out by the SMSC, traverses $MSC_A$ 725, and reaches the recipient party A 105.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network system for improved two-way communication between mobile subscribers, the network system comprising:
    a primary device that forwards a message over the network;
    a secondary device that receives the message;
    a database containing a plurality of forwarding and duplicating rules, wherein the forwarding and duplicating rules are instructions to
        forward the message to the secondary device when the primary device indicates a presence as one of switched off, roaming, and unable to receive messages,
        change the format of the message according to the secondary device,
        change the format of a reply generated by the secondary device from that of the secondary device to that of the primary device, and
        change an originating address in the reply to that of the primary device;
    a server capable of rerouting the message per the instructions in the database; and
    a presence and locations server on the network, the presence and locations server having logic for
        receiving a subscriber change of active status from the primary device and a location of the primary device, the location being a physical location and including information about a serving Mobile Switching Center (MSC), out of coverage information, and roaming information, and
        forwarding this change of status and the location to the server,
    wherein the forwarding and duplicating rules further include instructions to forward the message to the secondary device based on the location of the primary device.

2. The network system of claim 1, wherein either the primary or the secondary device is any wireless-enabled cellular phone or computer.

3. The network system of claim 1, wherein the message is a short message (SMS), multimedia message (MMS), or enhanced message (EMS).

4. The network system of claim 1, wherein the server is a messaging server or gateway within the mobile operator's network.

5. The network system of claim 1, wherein the message is transmitted over a SS7/GSM/MAP network.

6. The network system of claim 1, wherein the message is transmitted over a GPRS or equivalent packet-based network.

7. The network system of claim 1, wherein a mobile subscriber can at any time modify the forwarding and duplicating rules in the database.

8. The network system of claim 7, wherein the secondary device is a recipient of the message, wherein the mobile subscriber modifies the forwarding and duplicating rules to route the message to a sub-secondary device owned by the mobile subscriber, and wherein the destination address in the message is changed from that of the secondary device to that of the sub-secondary device.

9. The network system of claim 7, wherein the secondary device is an originator of the reply, and wherein the mobile subscriber modifies the forwarding and duplicating rules to change the originating address in the reply to that of a sub-secondary device owned by the mobile subscriber.

10. A network system for improved two-way messaging between mobile subscribers, the network system comprising:
    a primary wireless communications device that forwards a message over a mobile network;
    a secondary wireless communications device capable of receiving the message, wherein the message contains an originating address and a destination address;
    a server that is capable of storing and forwarding the message;
    a database containing a plurality of forwarding and duplicating rules, wherein the forwarding and duplicating rules are instructions to
        forward the message to a secondary device when the primary device indicates a presence as one of switched off, roaming, and unable to receive messages,
        change the format of the message according to the secondary device,
        change the format of a reply generated by the secondary device from that of the secondary device to that of the primary device, and
        change an originating address in the reply to that of the primary device;
    a processor capable of modifying the originating and/or destination addresses in the message per the forwarding instructions from the database; and
    a presence and locations server on the mobile network, the presence and locations server having logic for
        receiving a subscriber change of active status from the primary device and a location of the primary device, the location being a physical location and including information about a serving Mobile Switching Center (MSC), out of coverage information, and roaming information, and
        forwarding this change of status and the location to the server,
    wherein the forwarding and duplicating rules further include instructions to forward the message to the secondary device based on the location of the primary device.

11. The network system of claim 10, wherein the message is a short message (SMS), multimedia message (MMS), or enhanced message (EMS).

12. The network system of claim 10, wherein the server is a messaging server or gateway within the mobile operator's network.

13. The network system of claim 10, wherein the processor is an element of the mobile operator's network.

14. The network system of claim 10, wherein the message is transmitted over a SS7/GSM/MAP network.

15. The network system of claim 10, wherein the message is transmitted over a GPRS or equivalent packet-based network.

16. The network system of claim 10, wherein a mobile subscriber can at any time modify the forwarding and duplicating rules in the database.

17. The network system of claim 16, the secondary wireless communications device is a recipient of the message, wherein the mobile subscriber modifies the forwarding and duplicating rules to route the message to a sub-secondary wireless communications device owned by the mobile subscriber, and wherein the destination address in the message is changed from that of the secondary wireless communications device to that of the sub-secondary wireless communications device.

18. The network system of claim 16, wherein the secondary device is an originator of the reply, wherein the mobile subscriber modifies the forwarding and duplicating rules to change the originating address in the reply to that of a sub-secondary device owned by the mobile subscriber.

19. A method for enabling a mobile subscriber to receive and send messages using an alternate device, the method comprising:

receiving a message at a server, wherein the message contains a originating address and a destination address;

receiving a subscriber change of active status from a primary device and a location of the primary device, the location being a physical location and including information about a serving Mobile Switching Center (MSC), out of coverage information, and roaming information;

forwarding this change of status and location to the server;

determining from a database containing a plurality of forwarding and duplicating rules that the originating address and/or the destination address is to be changed, the forwarding and duplicating rules being instructions to forward the message to a secondary device when a primary device indicates a presence as one of switched off, roaming, and unable to receive messages, change the format of the message according to the secondary device, change the format of a reply generated by the secondary device from that of the secondary device to that of the primary device, and change an originating address in the message to that of the primary device;

replacing the originating address and/or the destination address in the message per the forwarding and duplicating rules in the database; and sending the message, wherein the forwarding and duplicating rules further include instructions to forward the message to the secondary device based on the location of the primary device.

20. The method of claim 19, wherein a mobile subscriber can at any time modify the forwarding and duplicating rules in the database.

* * * * *